United States Patent
Johnson et al.

(10) Patent No.: US 7,100,190 B2
(45) Date of Patent: Aug. 29, 2006

(54) AUTOMOBILE WEB CAM AND COMMUNICATIONS SYSTEM INCORPORATING A NETWORK OF AUTOMOBILE WEB CAMS

(75) Inventors: Steven M Johnson, Torrance, CA (US); Kikuo Hayashi, Van Nuys, CA (US); Kevin Mark Ashcraft, Redondo Beach, CA (US); Camille M Szalankiewicz, Toluca Lake, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 914 days.

(21) Appl. No.: 09/874,676

(22) Filed: Jun. 5, 2001

(65) Prior Publication Data

US 2002/0184641 A1    Dec. 5, 2002

(51) Int. Cl.
*H04N 7/173*    (2006.01)
(52) U.S. Cl. ...................................... 725/105; 348/148
(58) Field of Classification Search ............... 725/105; 379/88.2, 88.19, 88.21, 142.01–142.06, 88.11, 379/207.15, 372, 373.01, 376.01; 348/148, 348/159, 14.1
See application file for complete search history.

(56) References Cited

U.S. PATENT DOCUMENTS

| | | | | |
|---|---|---|---|---|
| 5,121,200 A | * | 6/1992 | Choi | 348/148 |
| 5,396,429 A | * | 3/1995 | Hanchett | 701/117 |
| 5,508,736 A | | 4/1996 | Cooper | |
| 5,600,368 A | * | 2/1997 | Matthews, III | 348/143 |
| 5,670,935 A | * | 9/1997 | Schofield et al. | 340/461 |
| 5,680,123 A | | 10/1997 | Lee | |
| 5,684,918 A | * | 11/1997 | Abecassis | 386/83 |
| 5,745,126 A | * | 4/1998 | Jain et al. | 382/154 |
| 5,793,420 A | * | 8/1998 | Schmidt | 348/148 |
| 5,917,405 A | * | 6/1999 | Joao | 340/426.17 |
| 6,002,995 A | * | 12/1999 | Suzuki et al. | 702/188 |
| 6,098,048 A | | 8/2000 | Dashefsky et al. | |
| 6,141,611 A | | 10/2000 | Mackey et al. | |
| 6,147,598 A | * | 11/2000 | Murphy et al. | 340/426.19 |
| 6,411,874 B1 | * | 6/2002 | Morgan et al. | 701/36 |
| 6,477,150 B1 | * | 11/2002 | Maggenti et al. | 370/312 |
| 6,529,233 B1 | * | 3/2003 | Allen | 348/211.2 |
| 6,636,256 B1 | * | 10/2003 | Passman et al. | 348/143 |
| 6,648,222 B1 | * | 11/2003 | McDonald et al. | 235/380 |
| 6,675,386 B1 | * | 1/2004 | Hendricks et al. | 725/105 |
| 6,747,692 B1 | * | 6/2004 | Patel et al. | 348/211.2 |
| 2001/0032335 A1 | * | 10/2001 | Jones | 725/105 |

\* cited by examiner

*Primary Examiner*—Gims Philippe
*Assistant Examiner*—Erick Rekstad
(74) *Attorney, Agent, or Firm*—Rankin, Hill, Porter & Clark LLP; Christen Millard (57) ABSTRACT

A communications system incorporating a plurality of vehicle mounted web cams that collect video information and transmit the video information together with other local information via a wireless network to a server. The video streams from the web cams and associated information are available to users on a internet web page. Each camera has a specific identifier to permit users to access the video of specific individual cameras. Optimization software permits users to take virtual trips along predetermined routes. The system also permits sequential access to multiple video feeds from desired locations. Multiple alternative one way and two way video communication methods taking advantage of the network of mobile web cams are described.

9 Claims, 5 Drawing Sheets

AUTOMOBILE WEB CAM AND COMMUNICATIONS SYSTEM INCORPORATING A NETWORK OF AUTOMOBILE WEB CAMS

BACKGROUND OF THE INVENTION

1. Field of the Invention

The present invention is generally directed toward web cameras and, more particularly, toward a communications system incorporating a series of mobile web cameras.

2. Description of Related Art

Cameras that collect video information and transmit streaming, video signals over the internet are well known in the art. Such cameras are referred to as web cams and are typically disposed at a fixed location. Depending upon the video information being transmitted, the servers and/or software associated with the web cams permit a specific audience or the general public to view the video feed. For example, the web cam may be mounted adjacent a video monitor and transmit the image of one computer user to only one other computer user. Systems incorporating such cameras are typically dedicated or linked for two-way video/audio communication, and require passwords or the like in order to access the video transmissions. As such, these systems are intended to serve as video telephones.

Other web cams are mounted in a fixed public place and are intended to provide the public with video information that is of general interest. For example, web cams have been used for remotely viewing the weather and traffic conditions.

Web cams are conventionally mounted at a fixed location to permit access to data transmission lines, thereby drastically limiting the application of web cam technology. Moreover, the systems known in the art do not permit a user or viewer of video transmissions to search multiple video transmissions from a network of web cams to identify a particular video transmission of interest.

SUMMARY OF THE INVENTION

The present invention is directed toward a network of mobile web cams and toward a system incorporating a network of mobile web cams. The present invention is also directed toward a system permitting visualization of images from remote mobile web cams and wherein a user or viewer may select a video transmission of particular interest from a plurality of available video feeds. The present invention is further directed toward a communication system incorporating mobile automobile-based web cams.

The present invention is directed toward an information or data gathering and distribution system wherein the data or information gathered includes video information from an automobile-based web cam. Other information that is gathered includes automobile information such as the speed, location, and direction of the automobile as well as environmental conditions, such as the temperature and humidity. Such gathered information is transmitted via a wireless network from a plurality of automobiles and displayed on an internet page.

The present invention is further directed toward a system and method for organizing and distributing information from multiple sources. In accordance with one preferred embodiment, a user or viewer of the video stream and associated information from multiple automobiles may input desired physical parameters and the inventive system will determine the information that best matches the user's parameters and will display the corresponding video information. Depending upon the user selections, the information supplied to the user may be information from a single vehicle or may be information from multiple vehicles provided in a determined sequence.

In accordance with another aspect of the present invention, a method and device for optically searching the video information from the network of mobile web cams is provided. The user may input information to be located, and the server will search the transmitting web cams to locate web cams containing the desired video information. The location of the identified web cam is displayed on a map, and the user may select the web cam to access the information transmitted therefrom

BRIEF DESCRIPTION OF THE DRAWINGS

These and further features of the invention will be apparent with reference to the following description and drawings, wherein.

DETAILED DESCRIPTION OF THE PREFERRED EMBODIMENT

Figure 1:
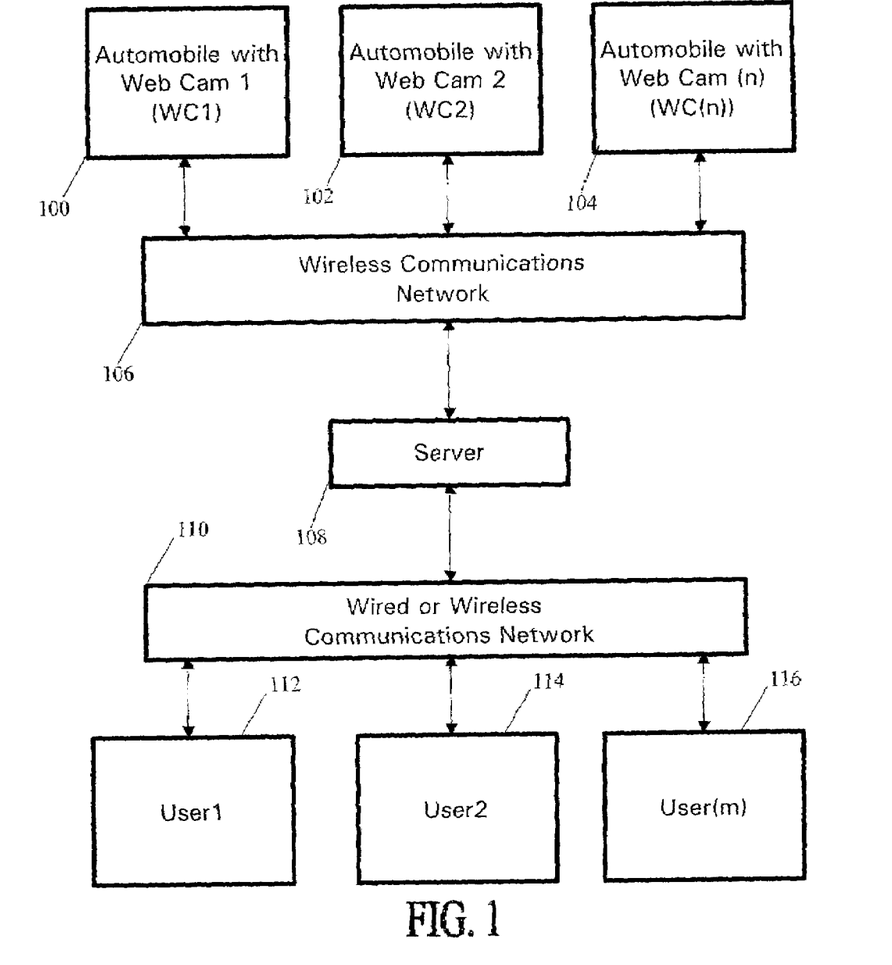
FIG. 1 is a schematic drawing illustrating a system according to the present invention.

With reference to the drawing figures, the present invention will be hereafter described. As illustrated in FIG. 1, one aspect of the present invention concerns a system or network of automobile-mounted web cams 100, 102, 104 that are operable to transmit video information via a wireless network 106 to a server 108. The server 108 incorporates software that organizes and displays the video information and other information on an internet web page. As will be apparent from the discussion to follow, it is contemplated that the server 108 will display the video information in formats desired by the user or viewer.

The system of the present invention takes advantage of a series of automobile based web cams. As will be readily appreciated, the number of web cams installed will be highly variable. Moreover, the number of web cams broadcasting at any given time will be variable as well. These factors and their importance in the operation of the system according to the present invention will be discussed hereinafter.

At least one web cam is mounted to each automobile that is part of the network of automobiles. In FIG. 1 the web cams WC1 (100), WC2 (102), and WC(n) (104), wherein n is a variable, are illustrated. Each of the web cams 100, 102, 104 may be disposed at a location and oriented such that it collects video information of the surrounding environment that may be of interest. For example, the web cams may be mounted to the forward-facing side of the rear view mirror so as to show the area in front of the vehicle. This location provides the web cam with a good general field of view as to what lies ahead of the automobile. Other desirable locations for cameras, which may be additional or optional cameras, include the side mirror (looking forward or rearward), the headlight/tail light, the top of the car, the sun visor and other interior or exterior locations that provide a desirable field of view.

Placement of the camera on the inside of the vehicle and directed toward the passenger compartment would enable others to see inside the automobile. This may be desirable for friends and family members. For example, it may prove convenient for a parent to check the automobile to determine who is in the car with his/her child. Also, rearwardly-facing web cams could be useful as backup cameras for the driver, as will be apparent from the following discussion.

Each web cam in the system carries its own specific, individual identifier. In the event that an automobile contains or carries more than one web cam, the web cam identifiers will preferably be related to one another in a coherent and logical fashion. Naturally, it is contemplated that access to the video streams from certain cameras, such as web cams that view the interior of the automobile, may be restricted by owner-designated passwords and other security measures. It is further contemplated that each of the web cams will only be turned on when the engine is running, and may be turned off (prevented from broadcasting) by the driver/passenger input of a password or PIN. Moreover, for security and privacy purposes, it is contemplated that the web cam will be configured to not broadcast (i.e., turned off) when the automobile is within a predetermined distance of any location designated by the automobile's owner. Such designated locations may be, for example, the automobile owner's home or place of work, or the homes of the automobile owner's friends and family.

As shown in FIG. 1, the video information from the web cam(s) in each automobile is transmitted, via the wireless network 106, to the server 108. The wireless network 106 may be a cellular telephone network, a dedicated satellite based network, a tower-based relay network, or any network now known or later developed that permits wireless transmission of the video information from the web cam(s) to the server. In this regard "wireless network" is meant to be as broad as possible, and does not exclude a network that is only partially wireless and, therefore, includes networks that have wireless portions (i.e., between the automobile or mobile unit and the related tower) that connect with wired portions (i.e., between the related tower and the server).

Together with the video information, other desired signals will be transmitted over the wireless network 106 to the server 108. These signals may include the speed, direction of travel, and location of the automobile. These signals may also include environmental information such as the outside air temperature, solar load, humidity, etc. The location of the automobile may be provided by known means, such as a Global Positioning System (GPS), or the like. Therefore, the information transmitted from the automobile will hereafter be referred to generically as "transmitted information", and this term is intended to include video information together with any other information, including audio information, that may be of interest to the user.

The transmitted information is delivered to the server and the server displays the information on a web page which is accessible to multiple users/viewers via a wired and/or wireless network 110. In this regard it is noted that the users 112, 114, 116, labeled User1, User2, User(m), wherein m is a variable, may be connected to a land line or may be connected to the server via a wireless-type connection. For example, User1 (112) may be an individual viewing the transmitted information on his/her computer or web enabled television. User2 (114) may be a person in an automobile having a video display. Such a video display could be part of a dashboard-mounted navigation system, or could be a video phone or a separate unit that is accessible to a passenger (i.e., wireless laptop computer, back seat entertainment system, etc.). In this way, the automobile containing web cam 1 (WC1) may also be User2. This dual role will prove useful as it permits the user to see views from the automobile that are otherwise difficult or impossible to visualize. For example, and as noted hereinbefore, being able to see behind the automobile with a rearwardly facing camera, such as from a tail light mounted camera, may prove advantageous.

The transmitted information may be displayed in many different formats or hierarchies according to the present invention. The most simple display would be to have each of the video feeds of the transmitted information occupy a window on the web page wherein selection of that particular window would enlarge the window for full-screen viewing. However, even in the case of only several hundred video feeds such a display may become unwieldy and inconvenient for the user. Therefore, a user-initiated search will preferably cause the server to organize or categorize the video streams according to the further information supplied with the video information from the automobiles. For example, the user may wish to only view video information from web cams in cars located within a prescribed geographic area (i.e., city, state, country) or may only wish to view video information from automobiles traveling a certain minimum speed, or may only wish to view video information from automobiles in areas above or below a certain temperature or elevation. Alternatively, the viewer may wish to only see video transmissions from certain cameras (i.e., forward-facing camera, interior camera, etc.). Accordingly, it is considered apparent that the organization and categorization of the transmitted information for display will take on many forms according to the present invention, and the present invention is not limited to any particular display hierarchy specifically described hereinafter.

Moreover, it is contemplated that the server store or archive a series of video feeds to permit users to access such feeds at convenient times. Such archived video feeds could be of significant events, such as automobile or motorcycle races, and other sporting events (i.e., caddie-cam to view the U.S. Open, jockey cam of the Kentucky Derby, road races such as the Boston Marathon and bicycle races Tour de France) and would provide the user with views from a mobile or moving source. Alternatively, such archived video feeds could be trips traversing specific paths at visually desirable times of year, such as drives along the Blue Ridge Parkway in the fall or through Yellowstone National Park in summer or winter. Accordingly, the server is useful for storage and subsequent user-initiated replay of transmitted information, as well as for live communication of transmitted information.

It is contemplated that such archived video feeds may be produced and edited professionally, and can incorporate views from a single automobile web cam or, alternatively, a composite view derived from plural automobile web cams. Such a composite view may be used to provide the best possible images along the desired route, or to produce other desired effects. For example, using existing video morphing technology, the user could have a time-lapse view from a particularly picturesque location in the Blue Ridge Mountains in the fall-winter. Such a view would be derived from individual web cams taking pictures at the same location over a period of time and, when combined by the server, would provide a time-lapse effect. As the database of images increases, the time-lapse effect may also be historical in nature to show changes in an area over a period of years.

In this regard it is also contemplated that the web cam user or owner may store their own trip for viewing at a later time. For example, a trip may be completely recorded on the server and played back once the user returns home or to some other destination. The web cam owner could bookmark certain times in the recording to permit quickly advancing to especially memorable portions of the recorded trip. It is believed that such functionality may be desirable for significant trips (anniversary, honeymoon, spring break) and may also be desirable, in an accelerated playback mode, to facilitate giving or remembering directions for purposes of navigation. It is noted that the web cam may be removably secured to the automobile and may be carried by the user for transmission and recordal of non-driving portions of the trip.

As will be appreciated by those skilled in the art, the system of the present invention is useful in many ways. In the following description the system set forth above and generally illustrated in FIG. 1 will be used in different preferred embodiments.

Figure 2:
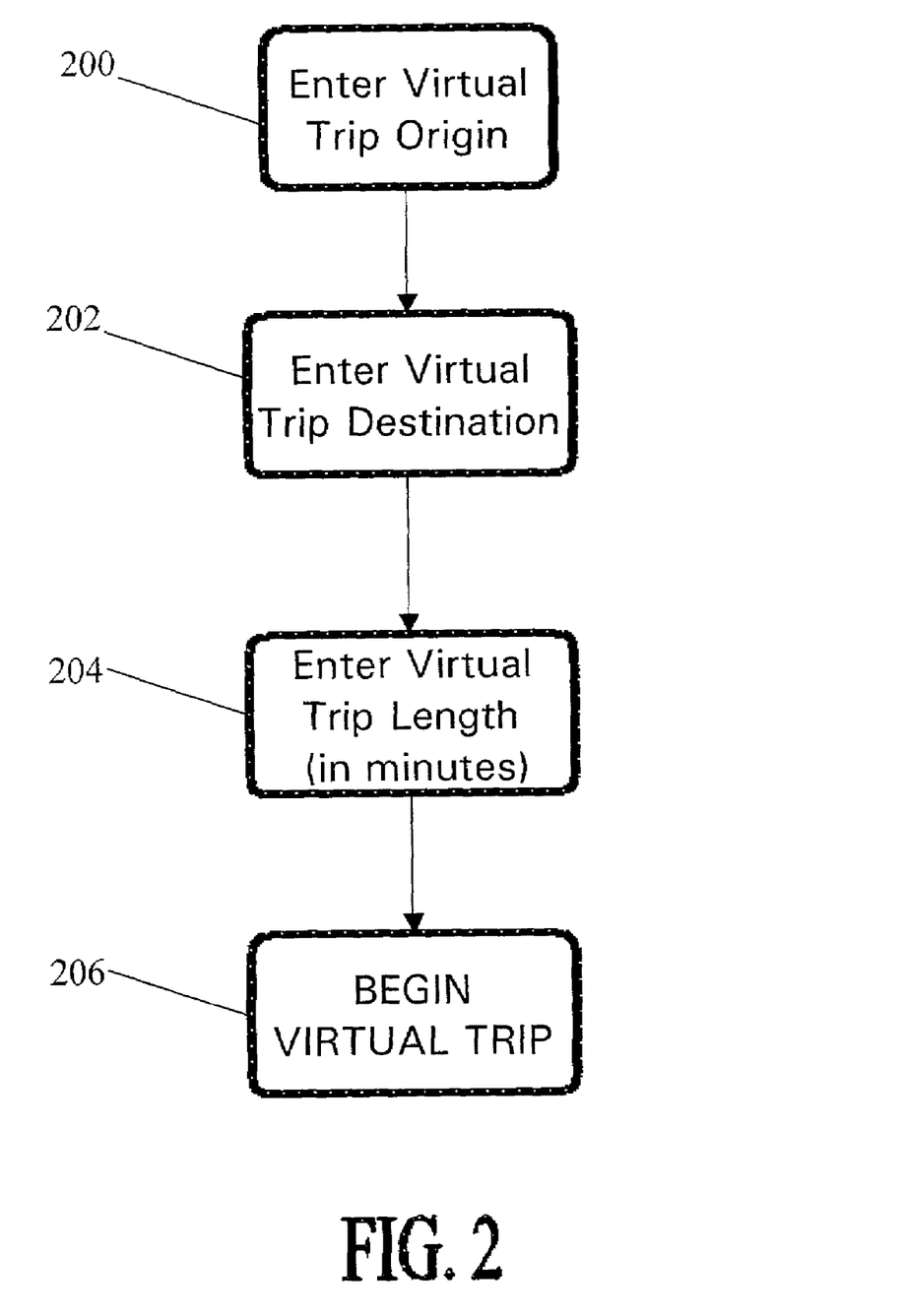
FIG. 2 is a flow chart illustrating steps of a virtual trip according to the present invention.

With reference to FIG. 2, the system according to the present invention is useful to go on virtual trips wherein the user can enter desired trip parameters and then sequentially obtain a live streaming video feed from a plurality of automobile web cams along the desired travel path. Alternatively, as noted hereinbefore, the user could access a stored or archived trip traversing a desired path, or a trip that they have previously recorded or stored. With reference to stored or archived trips, it is considered apparent that these trips can be accessed or selected from a menu or other means of display.

In accordance with this embodiment, the user enters a desired origin for the virtual trip (step 200), and then a desired virtual trip destination (step 202). The origin and destination could be cities, or could be specific addresses. Thereafter, the user would enter the length of the virtual trip in minutes (step 204).

The server would utilize optimization software to determine the number of currently-broadcasting web cams between the origin and destination, and to determine which of the broadcasting web cams to use for the virtual trip. The optimization software would also determine the duration of each view and would start the virtual trip (step 206).

For example, the user could select a route starting in Bangor, Me. and ending in San Francisco, Calif., and indicate that the trip take 10 minutes. The optimization software would determine the route, search for vehicles transmitting information along the route, determine which of the automobile transmissions to use, and determine the length of the broadcast from each automobile.

In this regard it is noted that while there may be many broadcasting web cams in urban areas, there may be relatively few in rural areas. The optimization software would take all this into account when determining which transmitted information to use.

Figure 3:
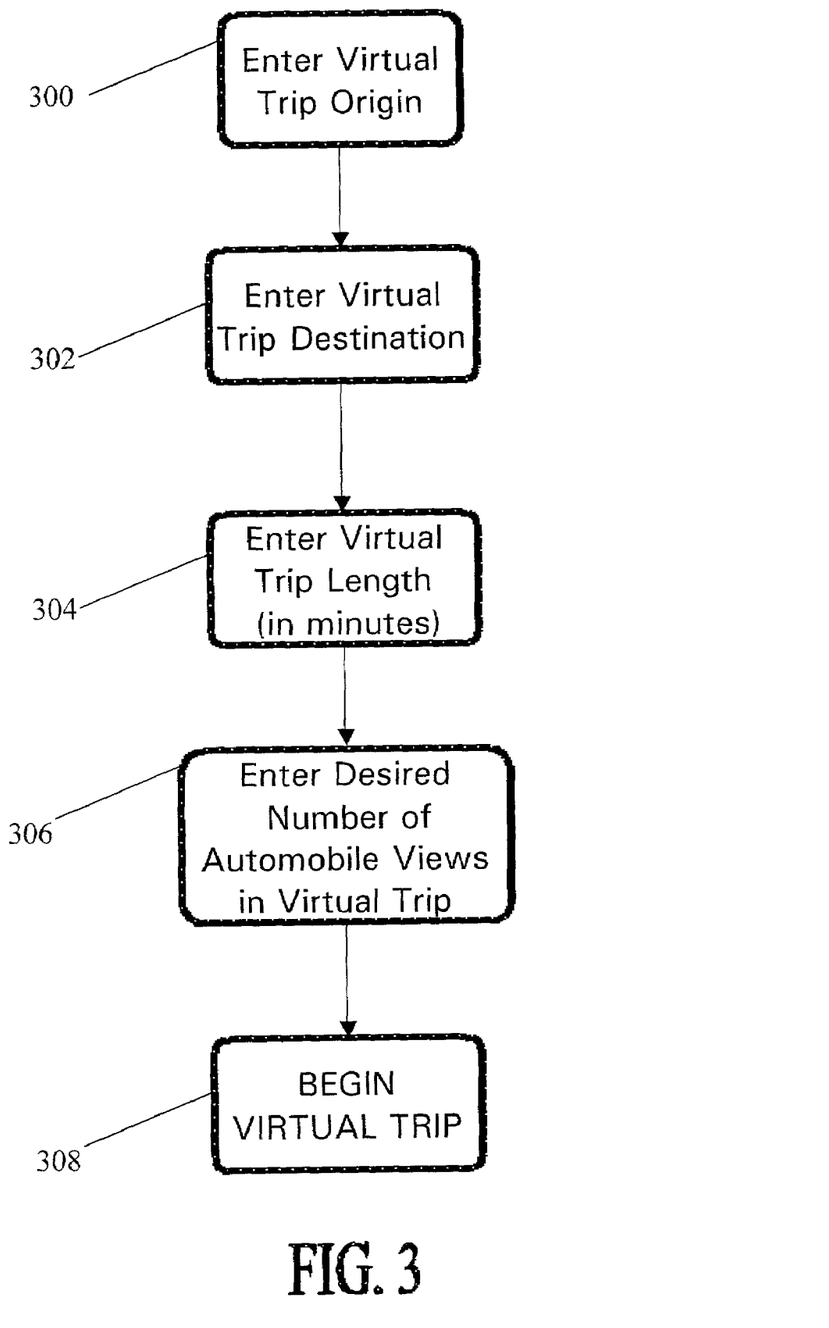
FIG. 3 is a flow chart illustrating steps of an alternative embodiment of a virtual trip according to the present invention.

The alternative embodiment illustrated in FIG. 3 differs from that of FIG. 2 by permitting the user to input the number of automobile virtual views (step 304) to be used on the virtual trip in addition to origin (step 300) and destination (302) to indicate the number of automobile virtual views to be used on the virtual trip. Accordingly, the embodiment of FIG. 3 provides the user with further control over the virtual trip constructed by the server software.

Naturally, it is contemplated that selection of the views to be used on the virtual trip selection process could be further controlled by the user. For example, the user may indicate that transmitted information only be used from automobiles traveling a certain minimum speed or only from automobiles heading a certain direction along the prescribed route. Moreover, depending upon the transmitted information available, the user may be able to select video information from automobiles traveling on a certain road or highway. Alternatively, the user may be able to select that stored or archived video transmissions or portions of stored or archived video transmissions can be used to fill in segments lacking live video feed. In this way, the virtual trip can be customized to satisfy the user's desires. In this regard it is noted that the virtual tour can be viewed on a normal computer monitor or television, or could be viewed using a virtual reality headset or other means.

In accordance with another preferred embodiment, the system according to the present invention is useful for determining commuting routes. It is often the case that people have two or more routes available to them for the commute to and from work. Unfortunately, when they get in the automobile, they have no reliable means to judge the traffic situation at critical places along the various routes. However, the present invention makes it possible to quickly check the traffic flow by directly observing the view from automobiles at the areas of interest. The information provided would not only include the location of the vehicle and the video information, but also the speed of the vehicle, making it easier for the driver/user to determine the best route to take.

Figure 4:
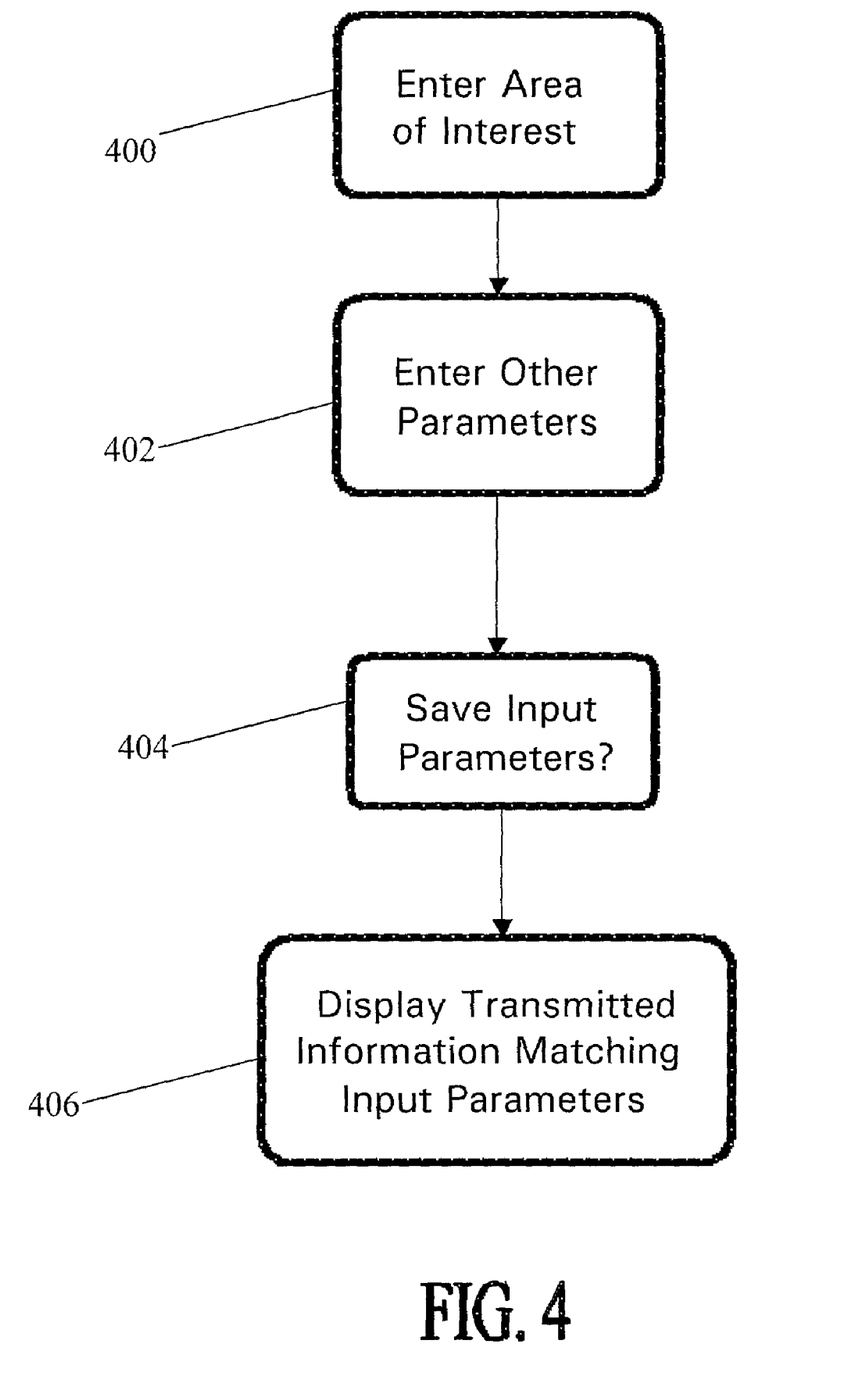
FIG. 4 is a flow chart illustrating a method for determining a desired travel route using the network of mobile web cams according to the present invention.

With reference to FIG. 4, the method according to this further preferred embodiment is illustrated, it being contemplated that these method steps are performed via the dashboard mounted navigation system or via a wireless device such as a laptop computer, web-enabled cell phone or the like. First, the user selects the area of interest (step 400), which according to the preferred embodiment is an intersection, highway interchange, or a length of road. The area of interest may be predetermined and stored in memory of the input device, as would be helpful when an intersection or the like is to be searched for traffic congestion daily.

The area of interest may be input into the navigation system or wireless device in any known means. For example, the area of interest may be typed in, or may be selected by means of a mouse and a graphical user interface of a map-type display, or by any other means. It is considered that using maps having a hierarchal structure wherein the user may select an area on a large-scale map and then move or zoom in to a more focused or specific view will be the most effective means of quickly selecting the area of interest. For example, using map views the user may select or highlight (i.e., click and drag) a particular length of road that is particularly troublesome. Once the area of interest is selected, the user may input other parameters (step 402), such as the direction of travel, to further specify the desired transmitted information of interest.

After the data regarding a new location is entered into the input device, the user will be queried as to whether the data should be stored for future use (step 404). This is particularly useful for daily commuters, and will permit them to quickly access the traffic information necessary to make the road-selection decision.

Based upon the input area of interest and other parameters, the server software determines and displays individual windows containing one or more video streams from automobiles in the selected area (step 406). As in the previously described embodiments, the user may select a particular video stream to enlarge to permit better viewing of the traffic conditions. Since the traffic congestion is of interest in this embodiment, the server software may also calculate and display the average speed of the automobiles in the vicinity of the selected area.

The ability to search for traffic conditions at intersections and interchanges would also be helpful to travelers as they navigate through unfamiliar areas. The ability to directly view the areas of interest provides the user with greater confidence and easier decision making. This ability would be particularly desirable when approaching a city and deciding whether it is better to take a bypass road, which is a longer route, or to drive directly through the city, which is a shorter route but typically has more traffic.

The system according to the present invention may also incorporate a series of web cams at fixed locations. The fixed web cams may be located at areas of general interest, such as at major intersections and areas overlooking highway interchanges and, as such, would be displayed together with mobile or automobile based video information during searches, discussed hereinbefore. The fixed web cams may also provide views from areas of specific interest, such as parking lots at shopping malls, stadiums, and amusement parks. In this way, overall or "big picture" views can be incorporated into the virtual trips and used to determine the best route available.

In addition to providing video information to the user, the transmitted information will also be useful in automobile navigation systems. For example, the navigation system could use the automobile speed and position data when calculating or determining the best route for the automobile to take to a destination.

In this regard it is noted that the inventors contemplate that the transmitted information from the network of web cams will be both public and private. With public transmitted information the general public will be given access to the streaming video information and/or other information provided by the automobile-based web cams. With private transmitted information, access to the streaming video information and/or other information will be restricted. Moreover, it is contemplated that some mix of public and private access may be provided wherein some views and/or information will be available to the general public while other views and/or functions are only provided to subscribers and/or to people having the correct password and/or access code.

For example, it may be decided that the video information from all forward-facing web cams will be provided to the public, while other information, including video information from interior-facing web cams, will be private information available only to persons having the correct access information. In this way, access to more private information may be restricted.

Also, it is contemplated that the transmitted information may be different for the various web cams used on any particular automobile. For example, transmitted information from a forward facing web cam may, in addition to the video information, include the speed location, direction, temperature information. On the other hand, transmitted information from an interior-facing camera may, in addition to the video information, include only audio information. Further, transmitted information from rearward facing cameras may include only the video information. As can be seen from the foregoing, the amount of available information transmitted with the video information may be freely selected, or may be predetermined based upon the location of the camera relative to the car.

Moreover, since each web cam has its own individual identifier, according to another embodiment of the present invention a user can access the transmitted information associated with a web cam and automobile by entering the specific identifier associated with that web cam. In keeping with this embodiment, for example, a family traveling to see their relatives could give the relatives the access code and identifier for the web cam. Thereafter, the relatives would be able to access the transmitted information to check on the location and progress of the family. Assuming that the transmitted information includes audio information and that the relatives have a similar web cam arrangement (i.e., permitting transmission of audio and video information), the relatives would be able to see and communicate with the family during the trip.

Figure 5:
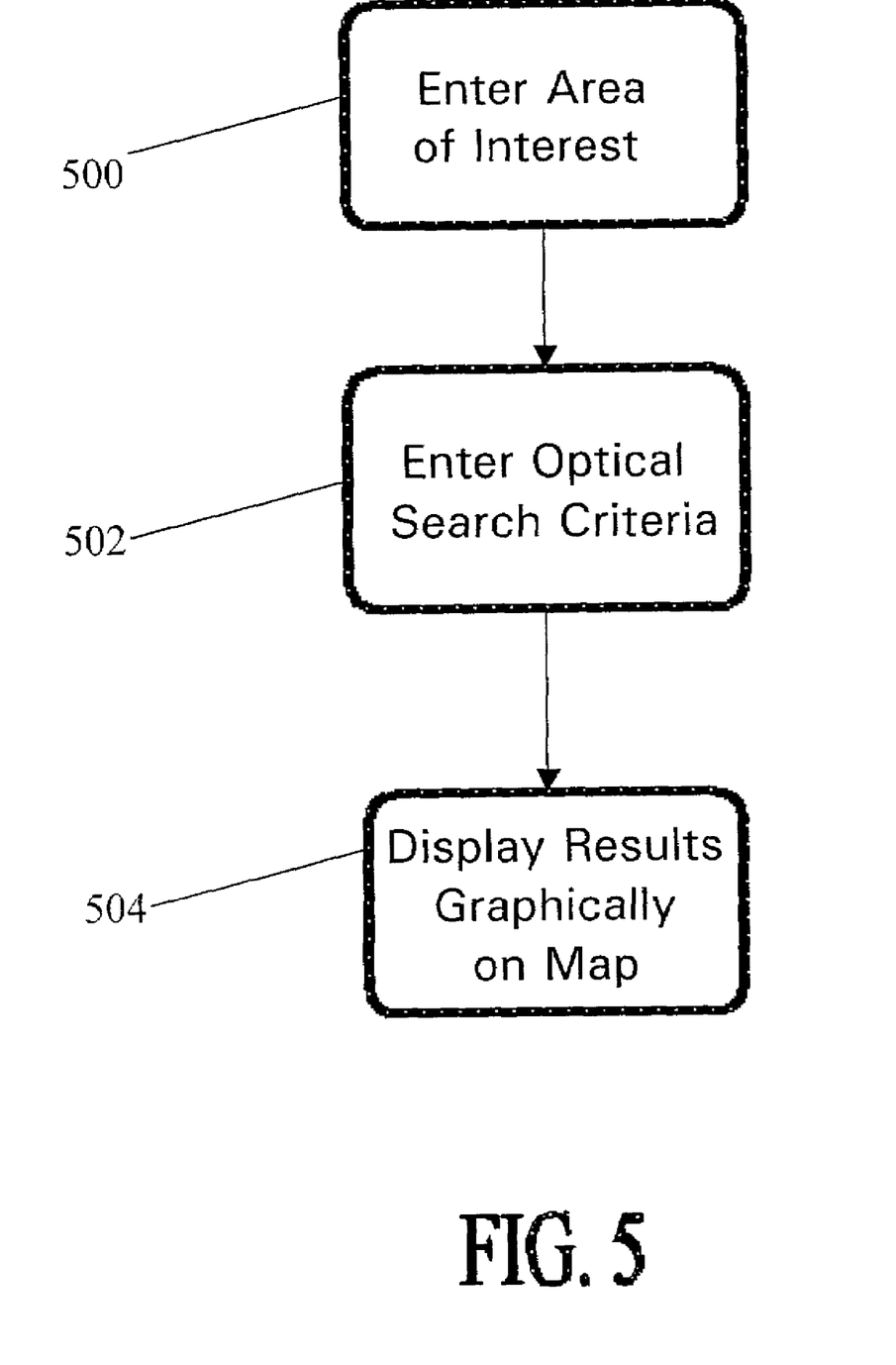
FIG. 5 is a flow chart illustrating an optical search according to the present invention.

With reference to FIG. 5, it is further contemplated that, in accordance with a further embodiment of the present invention, the network of web cams may be used for data mining or survey purposes. In this regard, using optical searching techniques, the web cam video information can be searched to locate video feeds having desirable images within their field of view. The location of the web cam could then be displayed on a map (i.e., by displaying an icon on the map). In this regard, as will be discussed more fully hereinafter, it is contemplated that sponsors could have their logos or signage optimized for optical recognition, or could have their locations predefined in the server memory. Further, the video feed of the web cams having desirable images within their field of view could be displayed or made available for selective display by the user.

In accordance with this embodiment, a user would input a desired area for search (step 500). Such an area could be input in any way, as described hereinbefore, including by selecting an area on the navigation system map, or by specifying a radius around the user's current location. The user would then input what is to be located (step 502). For example, if the user wanted to locate a nearby gas station, the user could search for web cams in his general vicinity (i.e, 2 miles) that have a gas station sign (optically recognizable) within the field of view. The server would identify the web cams in the specified area, and then would optically search the identified web cam transmissions and identify those having gas stations within their field of view. The server would then correlate and display the locations of the identified web cams on a map (step 504), and permit the user to select any of the identified web cams to view the associated video feed. Preferably, the identified web cams would be displayed as an icon on the map, and the user would select the icon to view the corresponding video feed. The user would be able to zoom the video feed to view price and brand information.

It is considered apparent that optical searching could be used to locate many items of interest, including signs containing recognizable symbols (i.e., parking lots, train stations, bus stops, police station), famous trademarks for restaurants, hotels, and stores, and that many optical searches could be predefined in an automobile based navigation system to facilitate searching and locating sponsor-specific locations. Also, the user could select the search criteria from a predefined menu of general categories (gas station, hotel, etc.) and submenus containing specific brands or subcategories.

The brands listed in the submenus may be sponsors of the system and, in this case, may have their locations readily overlaid on the map during the display of search results (step 504). This would insure that sponsor's businesses are located in the search even if they are not located by the optical search. If the sponsor's icon or trademark is shown on the map, clicking on the icon may provide specific information on that location, including a fixed web cam transmission, pricing and availability information, as well as links to the sponsor web site and promotions. Alternatively, the displayed results may be entirely derived from the optical search.

Accordingly, if the user is searching for hotels close to their current location, and does not specify the brand, the sponsors' icons within the designated area will be shown on the map as well as other hotels that are optically identified. Clicking on the icon would display information on the hotel, if it is a sponsor's hotel (i.e., availability, price, location, fixed web cam view, amenities), or the view from the corresponding web cam. The search results can be incorporated into an automobile navigation system such that, upon determination of the location of the web cam video feed (by making use of the transmitted information), the navigation system can show the location of the hotel as well as driving directions to the hotel. It is considered apparent that this capability would be very helpful in areas that are unfamiliar to the user, such as when the user is driving a rental car in an unfamiliar city.

Although the present invention has been described herein as it relates to placement of automobile-based web cameras, it is considered apparent that the web cams described herein could be used on other devices with equal functionality. For example, the web cams could be placed on boats, personal water craft, lawn mowers, scooters, bicycles, and motorcycles. Accordingly, the term "vehicle" as used in the claims attached hereto is meant to encompass any movable device to which the web cam may be attached, including powered and unpowered devices.

Moreover, it is further contemplated by the inventors that the web cams and the system described herein could be used with portable web cams that are hand held or mounted in another movable fashion. As noted hereinbefore, the automobile based web cam may be removably mounted to permit its use in place of a video camera. Also, the web cams could be mounted to pets (i.e., dog cam or cat cam) or to wild or performing animals (migrating bird cam, dolphin cam, elephant cam). Such cameras could be useful for entertainment and educational purposes, and would preferably include a special identifier to indicate to users and the server that the camera video feeds are for entertainment purposes and do not necessarily lie at a traversable location. In this way a virtual trip around the world could include pictures from very remote areas as well as urban areas.

It is further contemplated that a private network of web cams could be established that would be valuable for supervisory and safety purposes. For example, each police officer in a department could have a web cam secured to their hat or badge, and transmitted information would then include the video information from the area in front of the officer as well as the officer's location, etc. The web cams in such private networks could also be used by taxi companies, messenger services, delivery services, and any other enterprise having mobile workers that need to be monitored for productivity and safety. Conceivably, the transmitted information from each web cam could be saved for a predetermined period of time (i.e., one week) and then discarded if not backed up. This would give supervisors and authorities the chance to review the transmitted information should the need arise (i.e., in case of an accident or crime).

The present invention has been described herein with particularity, but it is noted that the scope of the invention is not limited thereto. Rather, the present invention is considered to be capable of numerous modifications, alterations, and combinations of components and steps and, therefore, is only defined by the claims appended hereto.

What is claimed is:

1. A communications system, comprising:
    a plurality of vehicles;
    a plurality of web cameras, each of said cameras being disposed in one of said vehicles and being active when the vehicle is running;
    means for transmitting information from said vehicles via a wireless network, said transmitted information including video information from said web cameras;
    a server for receiving the video information and displaying a plurality of images; and
    further comprising means for turning said web camera off when said vehicle is within a predetermined distance of a location designated by the vehicle's owner.

2. The communications system according to claim 1, wherein said server displays a predetermined image in place of said web camera video when said web camera is turned off.

3. The communications system according to claim 1, further comprising means for determining said vehicles' locations and wherein said transmitted information includes information on said vehicles' locations.

4. A communications system, comprising:
    a plurality of vehicles;
    a plurality of web cameras, each of said cameras being disposed in one of said vehicles and being active when the vehicle is running;
    means for transmitting information from said vehicles via a wireless network, said transmitted information including video information from said web cameras and an identifier for each of said web cams and wherein said transmitted information includes an identifier for each of said vehicle web cams;
    means for determining said vehicles' locations and wherein said transmitted information includes information on said vehicles' locations;
    a server for receiving the video information and providing a plurality of images for viewing by a plurality of communication system users wherein said server is operable to display the location and identifier for each web cam; and
    means for turning said web camera off when said vehicle is within a predetermined distance of a location designated by the vehicle's owner.

5. A method for collecting, organizing, and displaying video information from a plurality of sources, comprising the steps of:
    providing a plurality of web cams, each of said web cams being disposed in a vehicle and being operable only when said vehicle is operating and being operable to communicate video information;
    transmitting said video information from each of said web cams, via a wireless network, to a server;
    collecting and organizing the transmitted video information;
    collecting further information specific to said vehicle and said vehicle web cam, said further information comprising: vehicle location, vehicle speed, and camera orientation;
    transmitting said further information to said server; and
    displaying the collected and organized video information together with said further information on a web page.

6. The method according to claim 5, comprising the further steps of:

inputting user-selected parameters for desired web camera displays;

searching said further information to determine which of said web cams satisfy said user-selected parameters; and, permitting display of video information from said web cams satisfying said user-selected parameters.

7. The method according to claim 5, comprising the further steps of:

associating an individual identifier with each web cam;

transmitting said individual identifier to the server together with said video information;

permitting a user to search for a desired individual identifier such that video information from the web cam having said individual identifier is displayed.

8. The method according to claim 5, comprising the further steps of:

searching said further information to identify vehicles in a desired geographic location and, displaying video information from web cams in said desired geographic location.

9. The method according to claim 5, comprising the further steps of:

inputting a first geographic location and a second geographic location;

searching said further information to identify vehicles in a desired range of geographic locations between the first geographic location and the second geographic location, organizing the video information corresponding to said identified vehicles; and, displaying said video information such that the video information is shown sequentially from said first geographic location to said second geographic location.

* * * * *